(12) United States Patent
Cheng et al.

(10) Patent No.: US 7,534,117 B2
(45) Date of Patent: May 19, 2009

(54) CARD CONNECTOR

(75) Inventors: Yung-Chang Cheng, Tu-Cheng (TW); Ming-Lun Kuo, Tu-Cheng (TW)

(73) Assignee: Hon Hai Precision Ind. Co., Ltd., Taipei Hsien (TW)

( * ) Notice: Subject to any disclaimer, the term of this patent is extended or adjusted under 35 U.S.C. 154(b) by 0 days.

(21) Appl. No.: 11/789,138

(22) Filed: Apr. 24, 2007

(65) Prior Publication Data

US 2007/0249201 A1  Oct. 25, 2007

(30) Foreign Application Priority Data

Apr. 24, 2006  (TW)  ............................... 95206940 U

(51) Int. Cl.
*H01R 13/62* (2006.01)
(52) U.S. Cl. .................................... 439/159
(58) Field of Classification Search ................ 439/159, 439/160, 630; 235/475, 479
See application file for complete search history.

(56) References Cited

U.S. PATENT DOCUMENTS

| 6,319,029 | B2 * | 11/2001 | Nishioka ..................... 439/159 |
| 6,729,892 | B2 | 5/2004 | Takada et al. |
| 6,773,280 | B2 * | 8/2004 | Sasaki et al. ................. 439/159 |
| 6,783,399 | B2 * | 8/2004 | Joung ......................... 439/630 |

* cited by examiner

*Primary Examiner*—Alexander Gilman
(74) *Attorney, Agent, or Firm*—Wei Te Chung

(57) ABSTRACT

A card connector adapted for receiving a card, comprises an insulating housing, a plurality of contacts, a shell covering the insulating housing and defining a card receiving space and an ejector. The ejector comprises a locking equipment, a resilient member and a slider movable along the card insertion and ejection direction. The slider is formed by a metal piece and formed with an ejecting arm for ejecting the card directly and a locking arm for locking the card to the metal slider.

17 Claims, 9 Drawing Sheets

CARD CONNECTOR

BACKGROUND OF THE INVENTION

1. Field of the Invention

The present invention is generally related to a card connector, and more particularly, to a card connector which can hold a card therein securely.

2. Description of Related Art

With the development of electronic appliances, express card connectors are widely used to achieve data transmission between an express card and a corresponding electronic appliance. In order to assure transmission stability of data, the express card must be secured in a corresponding card connector when the express card is in a working state. And it is necessary to set a locking member to the card connector to prevent the card from pulling out by mistake during working.

A card connector comprises an insulting housing, a plurality of contacts received the insulting housing and an ejector. The ejector includes a slider with a heart groove, a metal pin, a spring urging the slider toward a card ejection direction and a latching equipment. The metal pin and the heart groove form a locking member together to lock the slider and the card at a final position. The latching equipment includes an elastic arm retained to the slider with a V-shape tail on a free end for engaging with a notch formed on a side of the card and a gap defined on a sidewall of the insulating housing adjacent to the slider. When the slider is at an original position, the free end of the elastic arm retained to the slider is able to move outwardly through the gap to allow the V-shape tail leave the notch of the card during an insertion of the card. When the slider is at the final position, the free end of the elastic arm is limited to move outwardly and the tail is kept at the notch of the card to prevent the card from pulling out by mistake. However, the metal elastic should be retained to the insulating housing reliably, so that the latching equipment causes a complex manufacture of the card connector, otherwise, if the notch defined on a top surface or a bottom surface of the card, not a lateral side of the card, the latching equipment will not work since the latching equipment can not move in a upright direction.

Hence, an improved card connector is required to overcome the disadvantages of the related art.

SUMMARY OF THE INVENTION

Accordingly, an object of the present invention is to provided a card connector which can hold a card therein securely.

To achieve the above objects, a card connector adapted for receiving a card comprises an insulating housing, a plurality of contacts, a shell covering the insulating housing and defining a card receiving space, and an ejector. The ejector has a locking equipment, a resilient member and a slider movable along a card insertion and ejection direction. The slider is stamped from a metal plate and formed with an ejecting arm for ejecting the card directly and a locking portion for locking the card to the metal plate. The shell defines a through hole for the locking portion passing through.

Other objects, advantages and novel features of the present invention will be drawn from the following detailed description of a preferred embodiment of the present invention with attached drawings:

DETAILED DESCRIPTION OF THE INVENTION

Reference will now be made in detail to the preferred embodiment of the present invention.

Figure 1:
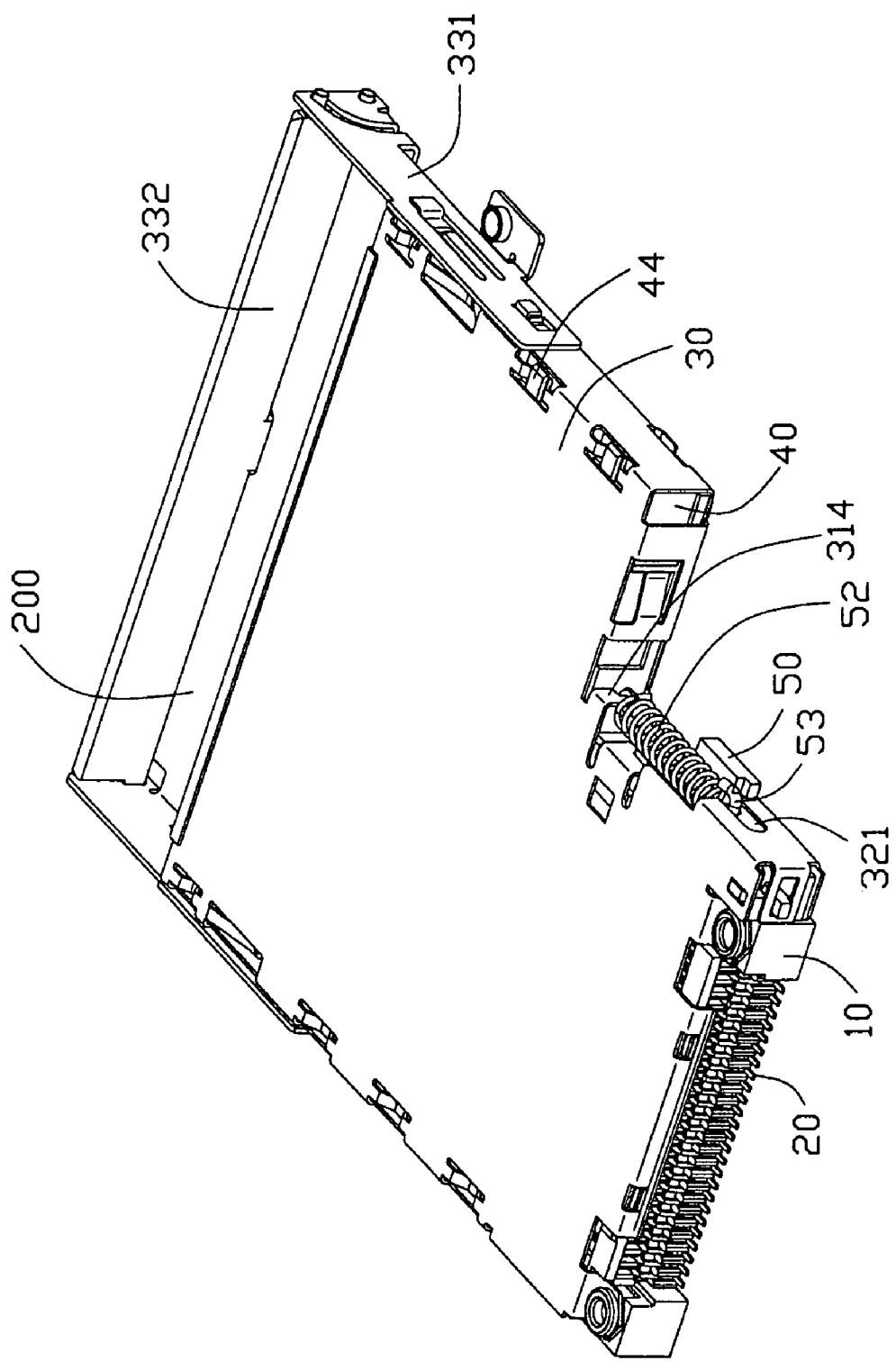
FIG. 1 is an assembled, perspective view of a card connector in accordance with the present invention.
Figure 2:
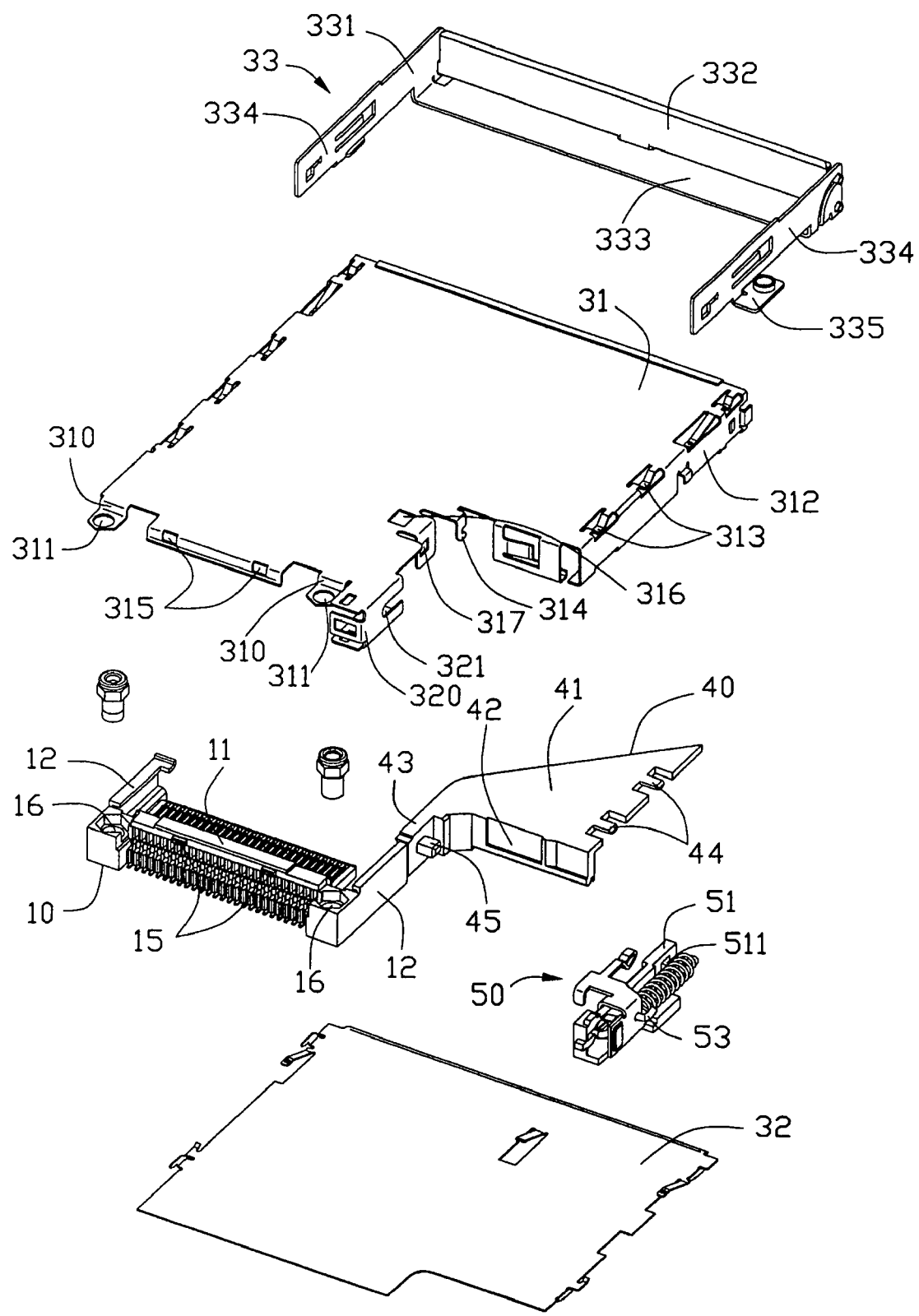
FIG. 2 is an exploded, perspective view of the card connector shown in FIG. 1.
Figure 7:
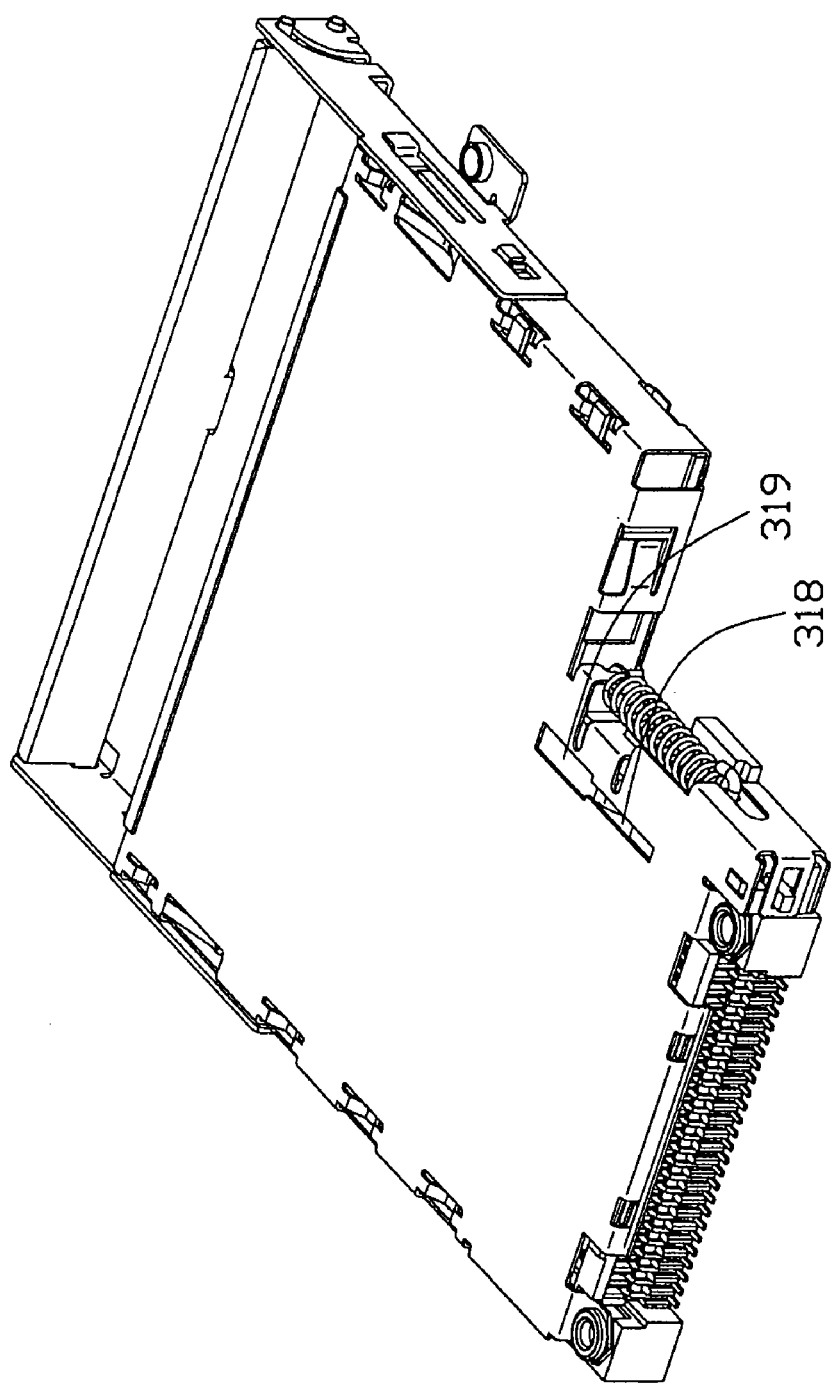
FIG. 7 is an assembled, perspective view of a card connector as an alternate embodiment of the present invention.

Referring to FIGS. 1-2 and 7, a card connector adapted for receiving an express card 100 comprises an elongated insulating housing 10, a plurality of contacts 20, a shell 30, a guide element 40 and an ejector 50 for ejecting the card 100.

Figure 3:
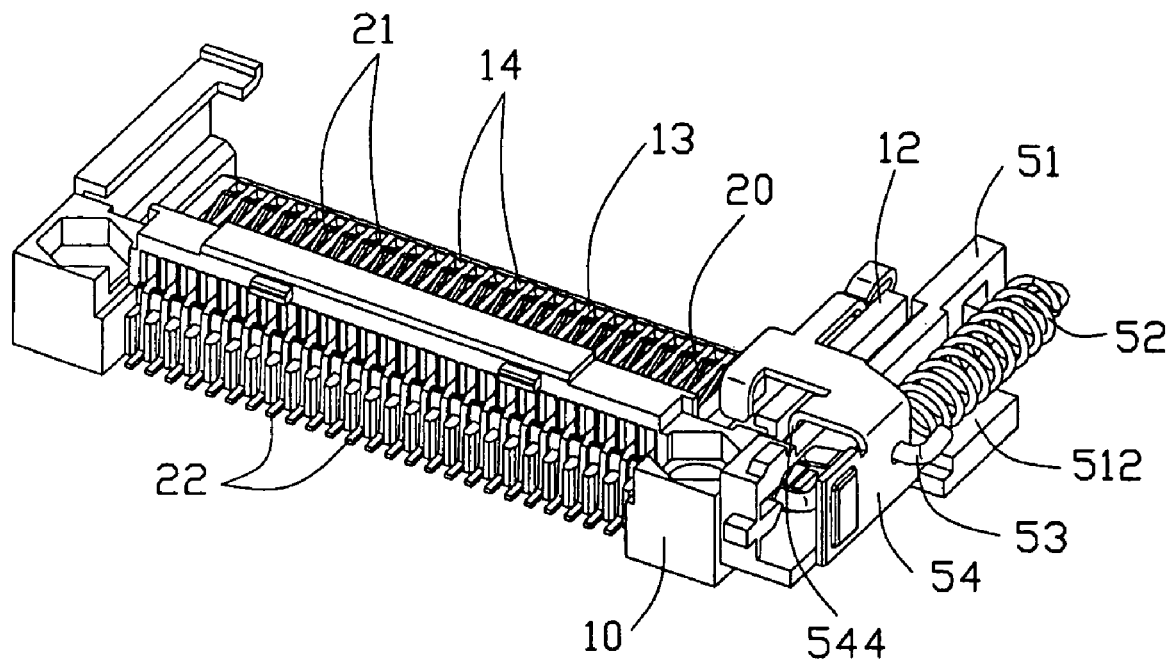
FIG. 3 is an assembled, perspective view of an insulating housing and an ejector of the card connector.

Referring to FIGS. 2 and 3, The insulating housing 10 has a base portion 11, a pair of guiding arms 12 respectively extending from opposed ends of the base portion 11 and a mating portion 13 extending from a center portion of the base portion 11 and disposed between the two guiding arms 12. The mating portion 13 defines a plurality of parallel contact channels 14 extending in a front-to-back direction. The base portion 11 has a pair of protruding portions 15 on a front edge thereof and a pair of column holes 16 on opposed lateral ends thereof.

The contacts 20 are assembled to the contact channel 14 of the insulating housing 10, each contact 20 has a contacting portion 21 for electrically contacting with the card 100, a soldering portion 22 soldered to a print circuit board (not shown) and a retaining portion (not shown) linking the contacting portion 21 and the soldering portion 22 and interference engaging with the insulating housing 10.

Referring to FIGS. 1-2, the shell 30 assembles to the insulating housing 10 and comprises an L-shaped top shell 31, an L-shaped bottom plate 32 and a door member 33, the top shell 31 and the bottom plate 32 are assembled to each other to define an L-shaped card receiving space 200 with a card insertion opening (not labeled) therebetween. The top shell 31 has a pair of elastic piece 310 with a through hole 311 on opposed ends of a front edge thereof covering the insulating housing 10. A fixing member (not labeled) passes through the through hole 311 of the top shell 31 and the column holes 16 of the insulating housing 10 to retain the shell 30 to the insulating housing 10. A front wall (not labeled) of the top shell 31 defines a pair of latching gaps 315 engaging with the protruding portions 15 of the insulating housing 10.

The shell 30 assembles to the insulating housing 10 after the ejector 50, an engaging portion 320 is provided by the top shell 31 and partially covers a top surface, a bottom surface, an outside surface and a front surface of a base 51 of the ejector 50. The engaging portion 320 defines a slot 321 on out side surface thereof to allow a pin member 53 of the ejector 50 to move. The top shell 31 has a through hole 316 on a top wall (not labeled) and adjacent to the ejector 50 and a latching hole 317 on a piece extending downwardly from the top wall thereof.

The door member 32 has a supporting portion 312 assembled on rear end of opposed sidewalls of the top shell 31 and a door 332 to open/close the card insertion opening. The supporting portion 312 is formed with a board 333 and two arms 334 on opposed sides of the board 333, the door 332 pivotally assembles to the arms 334 and has a protruding (not labeled) engaging with the board 333. The arms 334 respectively have a mounting portion 335 to be mount to the print circuit board.

Figure 4:
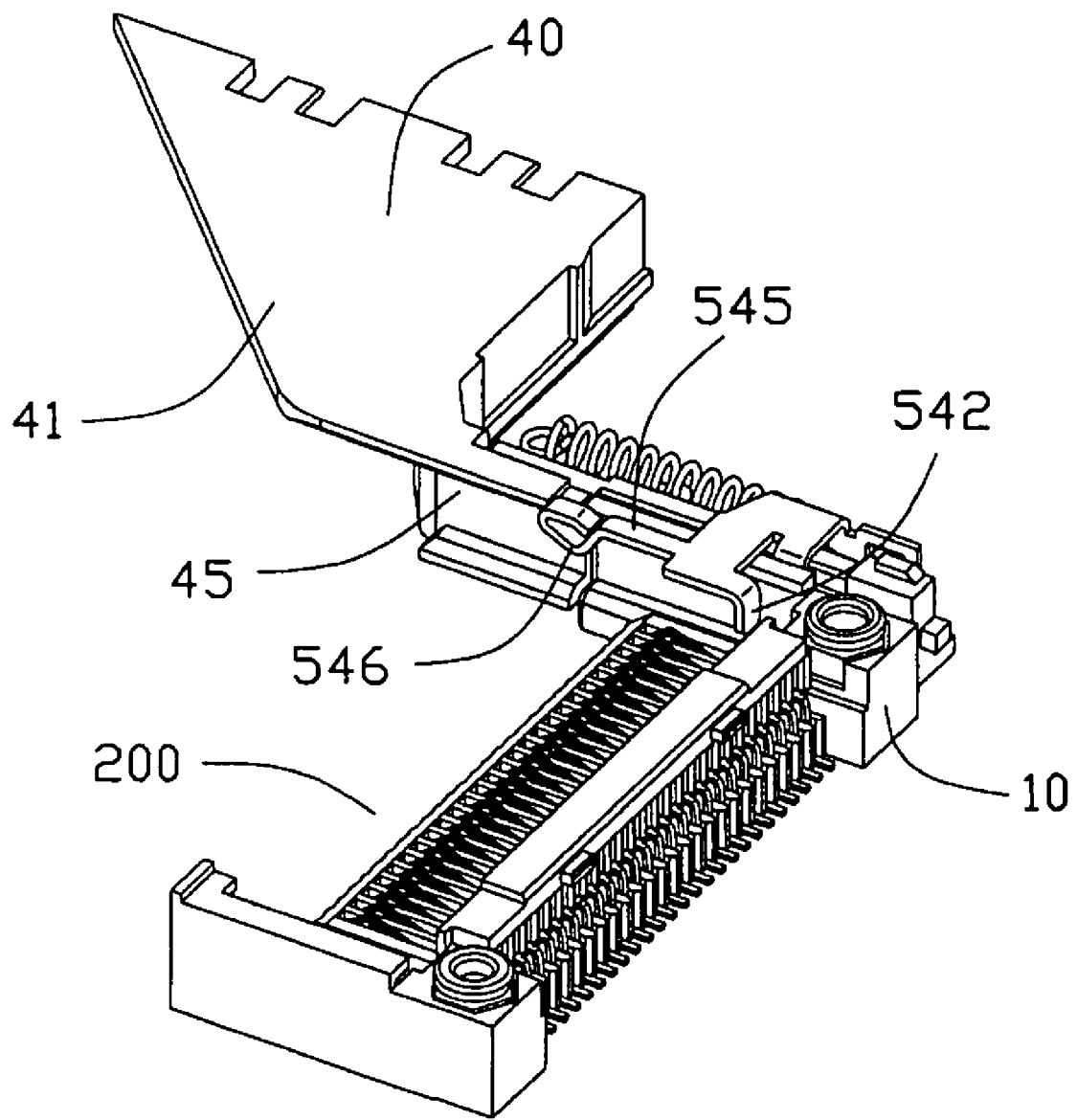
FIG. 4 is another assembled, perspective view of the card connector, but without a shell.
Figure 5:
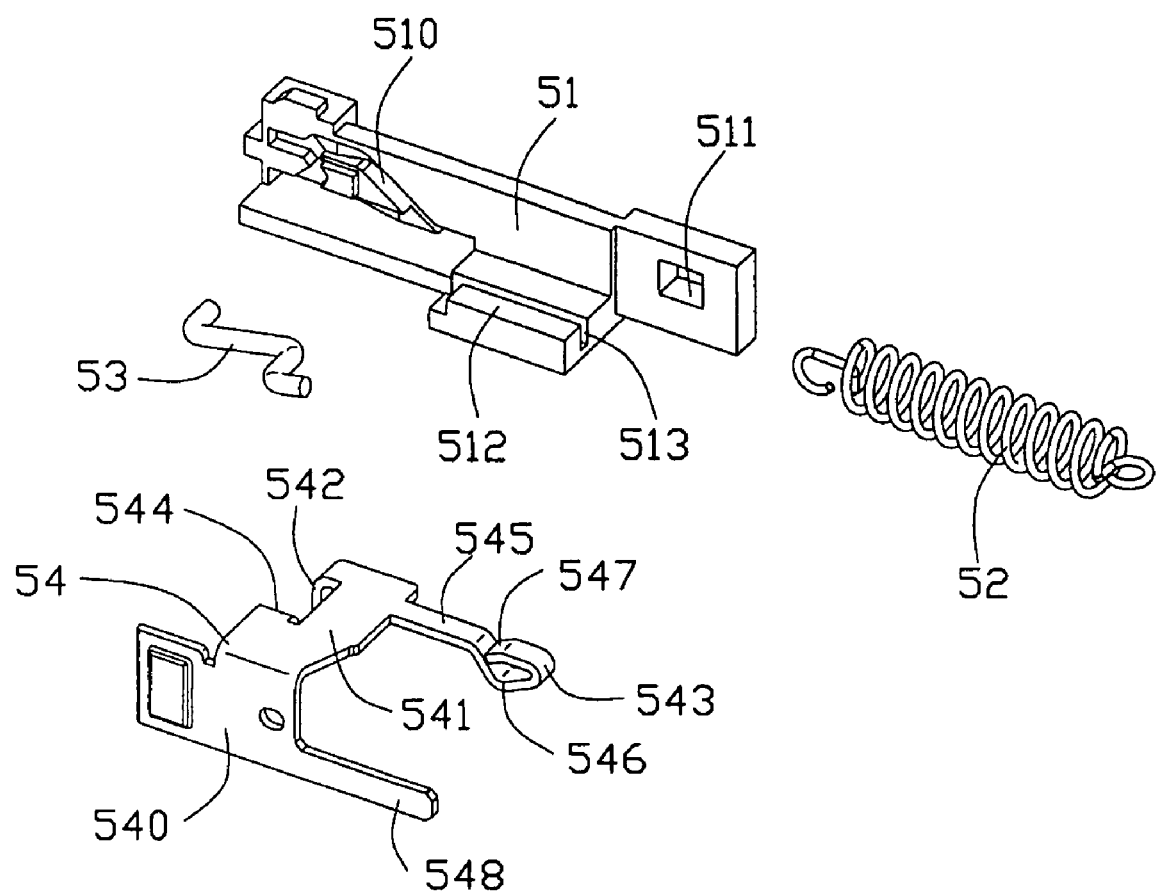
FIG. 5 is an exploded, perspective view of the ejector.

Referring to FIG. 4, the guide element 40 is approximately a triangle shape and assembled to the shell 30. The guide element 40 has a triangle shape board 41, a perpendicular wall 42 on a front end of the board 41 and a guiding wall extending from an inside of the wall 42. The board 41 and the perpendicular wall 42 has a plurality of wedges 44, 45 on outside faces thereof, the top shell 31 is formed with a plurality of elastic slice 313 for engaging with the wedges 44. The wedge 45 is used for retaining the ejector 50 to the top shell 31.

Referring to FIGS. 2-5, the ejector 50 assembled to a side of the insulating housing 10 comprises the base 51, a resilient member, a pin member 53, and a metal member 54 movably assembled to the base. In this embodiment, the resilient member is a spring 52. The base 51 is retained to and abutting against the guiding arm 12 adjacent to the guide element 40. The base 51 defines a heart-shaped slot 510 on an outside surface thereof, a through hole 511 for engaging with the wedge 45 of guide element 40 and a wing portion 512 extending outwardly from a bottom side thereof and defining a guiding passageway 513 for guiding the metal member 54.

The pin member 53 maybe unitary with the metal member 54, and has two ends, one end of the pin member 53 retained to the metal member 54 and the other end moveably received in the heart-shaped slot 510 of the base 51, the pin member 53 and the heart-shaped slot 510 serve as a locking equipment. The spring 52 is disposed between the ejector 50 and the top shell 31, one end of the spring 52 clasps to a locking piece 314 formed on the top shell 31, referring to FIG. 1, and the other end clasps to the pin member 53. The spring 52 is pulled when the pin member 53 moves following with the metal member 54. The metal member 54 defines an original position and a final position, when the metal member 54 is pushed by the card 100 and slides from the original position to the final position, the pin member 53 will move along the heart-shaped slot 510 and lock the metal member 54 at the final position, and the spring 52 will be elongated. When ejecting the card 100, pushing the metal member 54 again to release the locking, then the metal member 54 returns to the original position by a force of the spring 53. Since the ejector 50 is in a common push-to-push type, we will not give unnecessary details about a working process of the ejector 50.

The metal member 54 is moveably assembled on the base 51. The metal member 54 comprises a vertical wall 540 for retaining the pin member 53 and a horizontal wall 541 extending horizontally from an upper edge of the vertical wall 540. The vertical wall 540 has an extending arm 548 extending from a bottom portion of rear edge thereof. The horizontal wall 541 is formed with an ejecting arm 542 extending from an inner side of a front edge thereof, a locking arm 543 extending rearward from an inner side of a rear edge thereof and opposed to the ejecting arm 542 and a vertical guiding piece 544 extending along a card insertion direction from a center portion of the front edge thereof. The ejector 50 assembles to the insulating housing 1, the ejecting arm 542 and the locking arm 543 extend into the card receiving space 200 to engage with the card 100 directly, the guiding piece 544 inserts into an intervening space between the guiding arm 12 and the base 51 for sliding along the guiding arm 12. The extending arm 548 is received in and moves along the guiding passageway 513 of the base 51.

Figure 6:
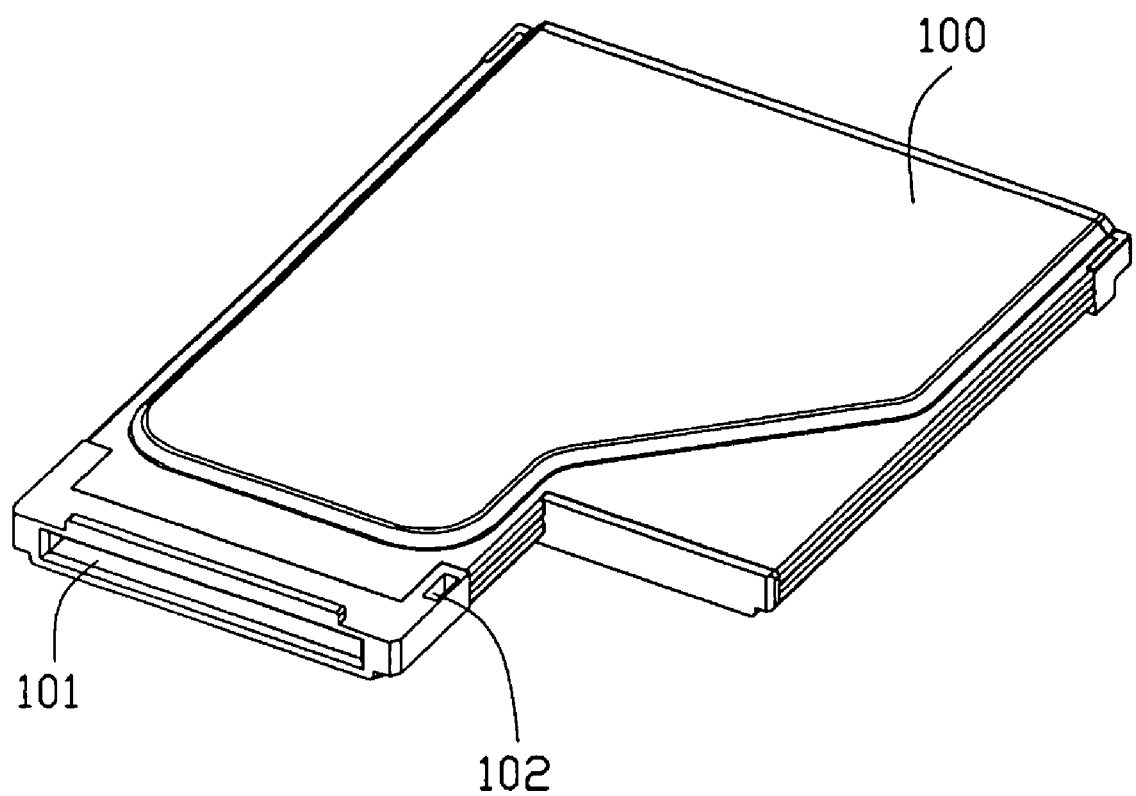
FIG. 6 is a perspective view, showing the metal member engaging with the card.
Figure 9:
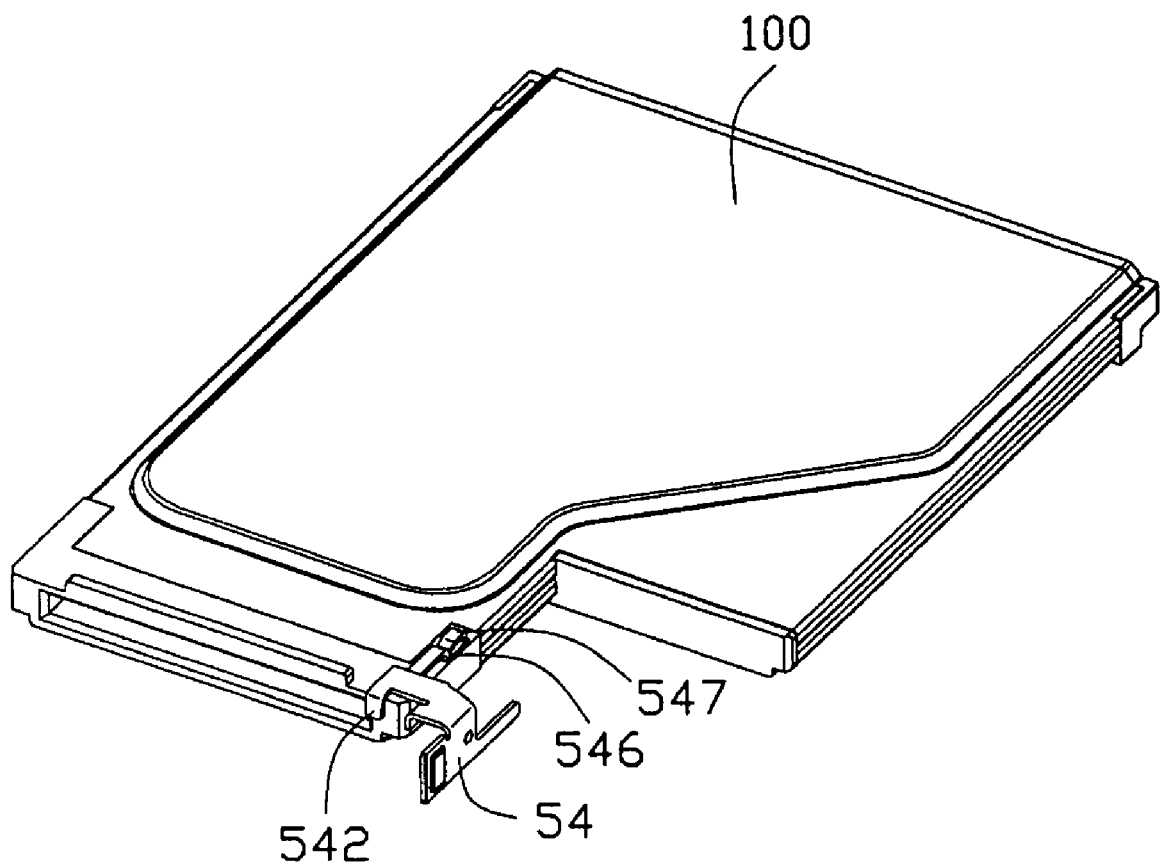
FIG. 9 is a perspective view of a card.

Conjoint with FIGS. 6 and 9, the card 100 defines a cavity 101 for receiving the mating portion 13 of the insulating housing 10 with a plurality of contact pads (not shown) for contacting with the contacts 20 and a recess 102 at a lateral side of a top surface thereof near the cavity 101. The locking arm 543 of the metal member 54 comprises a cantilever 545, a locking portion 546 extending rearward from the cantilever 545 and protruding downwardly into the recess 102 of the card 100 and a free end 547 upwardly and forwardly bent from the locking portion 546 to locate above the locking portion 546. The locking portion 546 is in a V-shaped, the free end 547 is near a side of the locking portion 546 adjacent to the cantilever 545 and forms an approximate rhombic shape together with the locking portion 546. When the locking portion 546 and the free end 547 are extruded to each other in a top-to-bottom direction, the free end 547 will abut against the locking portion 546 to prevent the locking portion 546 from further distorting. Otherwise, when the metal member 54 is at the original position, the locking portion 546 is aligned with the through hole 316, so that the locking portion 546 can move upwardly.

We will describe a process about the locking arm 543 engaging with the card 100. The card 100 inserts into the card receiving space 200, a front end of the card 100 will push the locking portion 546 upwardly through the through hole 316 of the top shell 31, when the card 100 contacts the ejecting arm 542, the locking portion 546 will insert into the recess 102 of the card 100 by elasticity of the cantilever 545, then the card 100 brings the metal member 54 to move together. When the metal member 54 arrives the final position, the locking member 546 is locked in the recess 102 of the card 100 by the top shell 31 to prevent the card 100 from pulling out by mistake. When the metal member 54 brings the card 100 returning to the original position, the locking portion 546 aligned with the through hole 316 again, so the card 100 will be pull out by fingers, easily.

Figure 8:
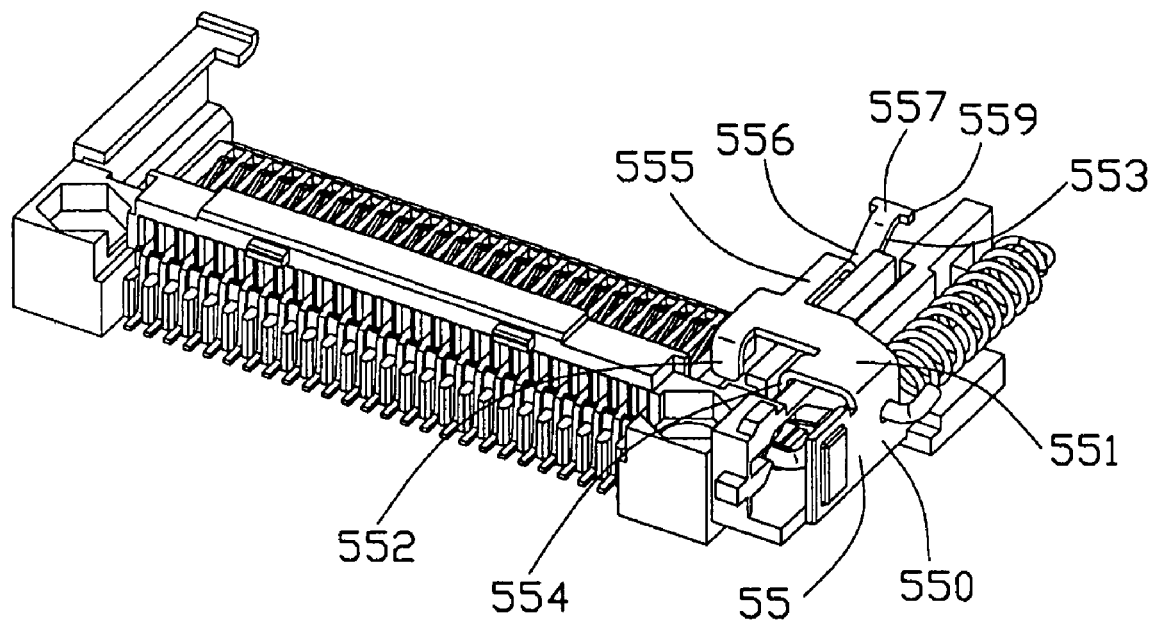
FIG. 8 is a perspective view, showing an alternate metal member engaging with the card.

Referring to FIGS. 7-8, showing an alternate metal member 55 for the card connector. The alternate metal member 55 has a vertical wall 550 with an extending arm (not shown), a horizontal wall 551 with an ejecting arm 552 and a locking arm 553 having a cantilever 555, a locking portion 556 and a free end 557, and a vertical guiding piece 554. Obviously, the alternate metal member 55 is in an approximate same configuration with the metal member 54 in the first embodiment, except that the free end 557 of the locking arm 553 further forms a pair of lateral wings 559, which make the free end 557 have a wider portion. The top shell is correspondingly formed with another hole 316 comprising a front rectangle hole 318 and a rear rectangle hole 319 communicating with and being wider than the front rectangle hole 318.

A part of the free end 557, where forms the wings 559, is wider than that of the front rectangle hole 318 and narrower than that of the rear rectangle hole 319, and the widths of the cantilever 555 and the locking portion 556 are both smaller than the front rectangle hole 318. So when the metal member 55 is at the original position, where the cantilever 555 is face to the front rectangle hole 318, the free end 547 is face to the rear rectangle hole 319, and the cantilever 555, the locking portion 556 and the free end 547 are all able to move upwardly. While the metal member 55 arrives to the final position, the free end 557 is face to the front rectangle hole 318 and is prevented from moving upwardly by the front rectangle hole 318, and the locking portion is kept in locking with the card.

While a preferred embodiment in accordance with the present invention has been shown and described, equivalent modifications and changes known to persons skilled in the art according to the spirit of the present invention are considered within the scope of the present invention as described in the appended claims.

What is claimed is:

1. A card connector adapted for a card, comprising:
an insulating housing;
a plurality of contacts received in the insulating housing;
a shell covering the insulating housing and defining a card receiving space for the card with an card insertion and ejection direction;
an ejector comprising a base, a locking equipment a resilient member and a metal plate movably assembled on the base and being movable along the card insertion and ejection direction, the metal plate formed with an ejecting arm for ejecting the card directly and a locking portion for locking the card to the metal plate.

2. The card connector as claimed in claim 1, wherein the metal plate has an original position where the locking portion is capable of releasing the card and a final position where the locking portion is locked with the card.

3. card connector as claimed in claim 2, wherein the shell has a horizontal wall defining a through hole according to the locking portion of the metal plate at the original position to allow the locking portion to pass through at the original position.

4. The card connector as claimed in claim 1, wherein the base of the ejector is retained to a side of the insulating housing and defines a heart-shaped slot, a pin member has two ends, one end moveably disposed in the heart-shaped slot and the other end retained to the metal plate, and forms the locking equipment together with the heart-shaped slot.

5. The card connector as claimed in claim 4, wherein the resilient member has two ends, which respectively latching the pin member and the shell.

6. The card connector as claimed in claim 4, wherein the shell has an engaging portion partially covering the ejector, a slot is defined on a sidewall of the engaging portion for the pin member of the ejector moving.

7. The card connector as claimed in claim 4, wherein the metal plate has a vertical wall and a horizontal wall inwardly extending from a top edge of the vertical wall, the horizontal wall is formed with the ejecting arm and the locking arm having the locking portion in an inner side thereof.

8. The card connector as claimed in claim 7, wherein the metal plate has a guiding piece extending downwardly for guiding the metal plate in the card insertion and ejecting direction.

9. The card connector as claimed in claim 7, wherein the locking arm has a cantilever, the locking portion and a free end, the free end is formed with a pair of lateral wings, which make the free end have a wider portion, the through hole of the shell has a front part and a rear part wider than the front part, the wider portion of the free end is able to pass through the rear part but can not pass though the front part of the through hole.

10. A card connector adapted for receiving a card, comprising:
an insulating housing:
a plurality of contacts received in the insulating housing;
a shell covering the insulating housing and defining a card receiving space with an insertion port and a card insertion and ejection direction, the shell having a horizontal wall defining a through hole;
an ejector comprising a slider movable along the card insertion and ejection direction, a resilient member and a locking equipment, the slider having an ejecting arm for directly ejecting the card and a locking portion for locking with the card and defining an original position and a final position, the locking portion being capable of releasing the card by moving through the through hole of the shell when the slider is at the original position, and keeping locking with the card when the slider is at the final position,
wherein the ejector comprises a base retained to a side of the insulating housing and defining a heart-shaped slot, a pin member has two ends, one end moveably disposed in the heart-shaped slot and the other end retained to the metal plate, and forms the locking equipment together with the heart-shaped slot, the metal plate is movably assembled on the base.

11. The card connector as claimed in claim 10, wherein the slider is a metal plate, the metal plate has a vertical wall and a horizontal wall inwardly extending from a top edge of the vertical wall, the horizontal wall is formed with the ejecting arm and the locking portions respectively on a front and a rear edges thereof.

12. The card connector as claimed in claim 11, wherein the locking arm has the locking portion and a free end, the free end is formed with a pair of lateral wings, which make the free end have a wider portion, the through hole of the shell has a front part and a rear part wider than the front part, the wider portion of the free end is able to pass through the rear part but can not pass through the front pan of the through hole.

13. The card connector as claimed in claim 12, wherein the shell has an engaging portion partially covering the ejector, a slot is defined on a sidewall of the engaging portion for the pin member moving.

14. The card connector as claimed in claim 11, wherein the base has a wing portion extending outwardly from a bottom side thereof and defining a guiding passageway for guiding the metal member.

15. An electrical card connector assembly comprising:
an electronic card defining a recessed region in a top face;
an insulating housing;
a plurality of contacts received in the insulating housing;
a shell downwardly covering the insulating housing and defining a card receiving space with an insertion port and a card insertion/ejection direction, the shell having a horizontal plate positioned upon the housing and defining a recess which upwardly reaches an exterior therein;
an ejector being movable along the card insertion/ejection direction, and including an ejecting arm, a resilient member with a locking portion at one end thereof, said ejector being moveable between a first position where the recess of the shell and the recessed region of the card are vertical aligned with each other so as to allow the locking portion to be moved out of the recessed region via outward deflection of the resilient member, and a second position wherein the recessed region and the recess are offset from each other along the card insertion/ejection direction so as to assure the locking portion not to leave the recessed region and accordingly secure the card in the card receiving space,
wherein the electing arm and the locking portion respectively extend from a horizontal wall of the ejector which is located and moveable under the horizontal plate,
wherein said horizontal wall extends, from which a vertical wall downwardly extend under a condition tat the vertical wall retains one end of in member of which the other end is moveable within a heart-shape slot which is formed in a stationary vertical face for determining movement of said ejector between the first position and the second position.

16. The card assembly as claimed in claim 15, further including a vertical guiding piece extending downwardly from the horizontal wall and laterally spaced from the vertical wall under a condition said vertical guiding piece extends in said card insertion/ejection direction.

17. The card assembly as claimed in claim 15, wherein said recess is a through hole exposed upwardly to the exterior so as to allow the locking portion to directly upwardly communicate with the exterior freely.

* * * * *